(12) United States Patent
Cunha et al.

(10) Patent No.: US 9,404,654 B2
(45) Date of Patent: Aug. 2, 2016

(54) GAS TURBINE ENGINE COMBUSTOR WITH INTEGRATED COMBUSTOR VANE

(71) Applicants: Frank J. Cunha, Avon, CT (US); Nurhak Erbas-Sen, Manchester, CT (US)

(72) Inventors: Frank J. Cunha, Avon, CT (US); Nurhak Erbas-Sen, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 378 days.

(21) Appl. No.: 13/627,697

(22) Filed: Sep. 26, 2012

(65) Prior Publication Data

US 2014/0137559 A1   May 22, 2014

(51) Int. Cl.
*F23R 3/16* (2006.01)
*F23R 3/06* (2006.01)
*F23R 3/26* (2006.01)

(52) U.S. Cl.
CPC ... *F23R 3/16* (2013.01); *F23R 3/06* (2013.01); *F23R 3/26* (2013.01); *F23R 2900/00018* (2013.01); *F23R 2900/03041* (2013.01); *Y02T 50/675* (2013.01)

(58) Field of Classification Search
CPC ............... F23R 3/04; F23R 3/002; F23R 3/06; F23R 3/50; F23R 3/14; F23R 3/286; F23R 3/26; F23R 3/16; F23R 3/343; F23R 2900/03041; F23R 2900/00018; Y02T 50/675; F01D 9/041; F05B 2240/801; F23C 7/004
USPC .................................... 60/751, 754, 748, 804
See application file for complete search history.

(56) References Cited

U.S. PATENT DOCUMENTS

| 3,316,714 | A | | 5/1967 | Smith et al. |
| 3,374,624 | A | | 3/1968 | Coplin |
| 3,433,015 | A | * | 3/1969 | Sneeden ......................... 60/804 |
| 4,653,279 | A | | 3/1987 | Reynolds |
| 5,113,648 | A | | 5/1992 | Shekleton et al. |
| 5,131,221 | A | | 7/1992 | Shekleton |
| 5,220,795 | A | | 6/1993 | Dodds et al. |
| 5,239,818 | A | | 8/1993 | Stickles et al. |
| 5,261,223 | A | | 11/1993 | Foltz |
| 5,323,604 | A | | 6/1994 | Ekstedt et al. |
| 5,735,681 | A | | 4/1998 | Cheng |
| 5,879,148 | A | | 3/1999 | Cheng et al. |
| 5,997,595 | A | | 12/1999 | Yokohama et al. |
| 6,101,814 | A | | 8/2000 | Hoke et al. |
| 6,105,372 | A | | 8/2000 | Mandai et al. |
| 6,205,789 | B1 | | 3/2001 | Patterson et al. |
| 6,247,310 | B1 | | 6/2001 | Norris et al. |
| 6,408,629 | B1 | | 6/2002 | Harris et al. |
| 6,513,331 | B1 | | 2/2003 | Brown et al. |

(Continued)

FOREIGN PATENT DOCUMENTS

| DE | 102010020389 | 11/2011 |
| DE | 102010021997 | 12/2011 |

(Continued)

OTHER PUBLICATIONS

EP search report for EP13864570.0 dated Apr. 4, 2016.

*Primary Examiner* — Ehud Gartenberg
*Assistant Examiner* — Jared W Pike
(74) *Attorney, Agent, or Firm* — O'Shea Getz P.C.

(57) ABSTRACT

A combustor section for a gas turbine engine includes a combustor vane which extends at least partially into a combustion chamber.

19 Claims, 10 Drawing Sheets

(56) References Cited

U.S. PATENT DOCUMENTS

| | | |
|---|---|---|
| 6,536,207 B1 | 3/2003 | Kamen et al. |
| 6,543,233 B2 | 4/2003 | Young et al. |
| 6,553,767 B2 | 4/2003 | Farmer et al. |
| 6,655,149 B2 | 12/2003 | Farmer et al. |
| 6,705,081 B2 | 3/2004 | Kamen et al. |
| 6,829,897 B2 | 12/2004 | Moriya et al. |
| 6,854,258 B2 | 2/2005 | Moriya et al. |
| 7,007,470 B2 | 3/2006 | Langenfeld et al. |
| 7,111,460 B2 | 9/2006 | Jensen et al. |
| 7,308,787 B2 | 12/2007 | LaRocque et al. |
| 7,310,945 B2 | 12/2007 | Gurski et al. |
| 7,373,772 B2 | 5/2008 | Simons et al. |
| 7,654,084 B2 | 2/2010 | Jensen et al. |
| 7,699,583 B2 * | 4/2010 | Cunha .................. 416/97 R |
| 7,726,131 B2 | 6/2010 | Sze et al. |
| 7,870,736 B2 | 1/2011 | Homitz et al. |
| 7,934,926 B2 | 5/2011 | Kornbluth et al. |
| 8,006,511 B2 | 8/2011 | Kamen et al. |
| 8,028,529 B2 | 10/2011 | Venkataraman et al. |
| 8,047,001 B2 | 11/2011 | Beeck et al. |
| 8,069,676 B2 | 12/2011 | Kamen et al. |
| 8,176,739 B2 | 5/2012 | Evulet et al. |
| 8,177,547 B2 | 5/2012 | Kostlin et al. |
| 2007/0084213 A1 | 4/2007 | Burd et al. |
| 2008/0145235 A1 | 6/2008 | Cunha et al. |
| 2008/0317585 A1 | 12/2008 | Lee et al. |
| 2009/0081048 A1 | 3/2009 | Beeck et al. |
| 2009/0185903 A1 | 7/2009 | Beeck et al. |
| 2010/0126176 A1* | 5/2010 | Kim ................................ 60/748 |
| 2010/0205971 A1* | 8/2010 | Williams et al. ................ 60/748 |
| 2010/0251719 A1* | 10/2010 | Mancini et al. ................. 60/737 |

FOREIGN PATENT DOCUMENTS

| | | |
|---|---|---|
| DE | 202010017464 | 1/2012 |
| EP | 2386797 | 11/2011 |
| WO | 0165100 | 9/2001 |

* cited by examiner

FIG.12

GAS TURBINE ENGINE COMBUSTOR WITH INTEGRATED COMBUSTOR VANE

BACKGROUND

The present disclosure relates to a gas turbine engine and, more particularly, to a combustor therefor.

Gas turbine engines, such as those which power commercial and military aircraft, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel injectors axially project into a forward section of the combustion chamber to supply the fuel for mixing with the pressurized air.

Combustion of the hydrocarbon fuel in the presence of pressurized air may produce nitrogen oxide ($NO_X$) emissions that are subjected to excessively stringent controls by regulatory authorities, and thus may be sought to be minimized.

At least one known strategy for minimizing $NO_X$ emissions is referred to as rich burn, quick quench, lean burn (RQL) combustion. The RQL strategy recognizes that the conditions for $NO_X$ formation are most favorable at elevated combustion flame temperatures, such as when a fuel-air ratio is at or near stoichiometric. A combustor configured for RQL combustion includes three serially arranged combustion zones: a rich burn zone at the forward end of the combustor, a quench or dilution zone axially aft of the rich burn zone, and a lean burn zone axially aft of the quench zone.

During engine operation, a portion of the pressurized air discharged from the compressor enters the rich burn zone of the combustion chamber. Concurrently, the fuel injectors introduce a stoichiometrically excessive quantity of fuel into the rich burn zone. Although the resulting stoichiometrically fuel rich fuel-air mixture is ignited and burned to release the energy content of the fuel, $NO_X$ formation may still occur.

The fuel rich combustion products then enter the quench zone where jets of pressurized air radially enter through combustion air holes into the quench zone of the combustion chamber. The pressurized air mixes with the combustion products to support further combustion of the fuel with air by progressively deriching the fuel rich combustion products as they flow axially through the quench zone. The fuel-air ratio of the combustion products changes from fuel rich to stoichiometric, causing an attendant rise in the combustion flame temperature. Since the quantity of $NO_X$ produced in a given time interval increases exponentially with flame temperature, quantities of $NO_X$ may be produced during this initial quench process. As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate quantities of $NO_X$.

Low NOx combustor designs stabilize the primary combustion zone with a swirling flow and cooling jets through combustion holes close to this zone. To assist in primary zone stabilization, the combustor configuration also may have a bulged contour. Subsequent to these designs, improved airblast injectors with one or two rows of unopposed dilution jets were provided for rapid mixing. Trends to decrease residence time with further NOx reduction continued with increasingly strong dilution jets. From the data acquired to-date through engine testing, demonstration and certification requirements, the stability for primary zone combustion followed by (close to) stoichiometric combustion are directly related to (1) the mixing characteristics of fuel-air injectors, (2) aerodynamic contouring of the combustion chamber, and (3) the dilution jet Such combustion processes with several stages of combustion is desirable; however, a minimum length for the combustor is required, which, in turn, may result in a relatively significant weight requirement.

Existing combustor configurations of dilution cooling/mixing jets may also penetrate into the mixing zone with sufficient strength which may lead to a quasi-one-dimensional momentum for each dilution jet, prior to an onset of a desired counter-swirl effect of the two jets combined. This may result in an exit temperature profile that assumes circumferentially peaks which may expose the turbine to excessive temperatures.

SUMMARY

A combustor section for a gas turbine engine according to one disclosed non-limiting embodiment of the present disclosure includes a combustion chamber and a combustor vane that extends at least partially into said combustion chamber.

In a further embodiment of the foregoing embodiment, the combustor section includes an outer liner and an inner liner disposed radially inward of the outer line and the chamber being defined between the outer and inner liners, the combustor vane located between the outer liner and the inner liner.

In a further embodiment of any of the foregoing embodiments, the combustor vane defines an axial length between 35%-65% of the combustion chamber, the axial length defined along an axis which extends from a fuel injector through the combustion chamber.

In a further embodiment of any of the foregoing embodiments, the combustor vane includes a dilution jet on a leading edge thereof.

In a further embodiment of any of the foregoing embodiments, the combustor vane includes film cooling along a leading edge thereof.

In a further embodiment of any of the foregoing embodiments, the combustor vane includes a helical axial swirler along a leading edge thereof.

In a further embodiment of any of the foregoing embodiments, the combustor vane is manufactured of a refractory metal core (RMC) material.

In the alternative or additionally thereto, the foregoing embodiment includes the combustor vane includes an RMC circuit along a main body thereof. In the alternative or additionally thereto, the foregoing embodiment includes the combustor vane includes centerline RMC microcircuit with pedestals along a trailing edge thereof.

In a further embodiment of any of the foregoing embodiments, the combustor vane includes a multiple of helical axial swirlers along a leading edge thereof.

In the alternative or additionally thereto, the foregoing embodiment includes a first of the multiple helical axial swirlers is axially offset with respect to a second of the multiple of helical axial swirlers. In the alternative or additionally thereto, the foregoing embodiment includes a first of the multiple of helical axial swirlers defines a first angle and a second of the multiple of helical axial swirlers defines a second angle, the first angle different than the second angle. In the alternative or additionally thereto, the foregoing embodiment includes a first of the multiple of helical axial swirlers defines a first pitch and a second of the multiple of helical axial swirlers defines a second pitch, the first pitch different than the second pitch. In the alternative or additionally thereto, the foregoing embodiment includes a first of the multiple of helical axial swirlers defines a first size and a second of the multiple of helical axial swirlers defines a second size, the first size different than the second size. In the alternative or additionally thereto, the foregoing embodiment includes the multiple of helical axial swirlers are stacked along said leading edge.

A gas turbine engine according to another disclosed non-limiting embodiment of the present disclosure includes a combustor section and a turbine section downstream of the combustor section, the turbine section includes a turbine rotor immediately downstream of the combustor section.

In a further embodiment of the foregoing embodiment, the combustor section includes a combustion chamber and a combustor vane which extends at least partially into the combustion chamber.

In a further embodiment of any of the foregoing embodiments, the combustor vane includes a multiple of helical axial swirlers on a leading edge thereof.

A combustor section vane for a combustor for a gas turbine engine according to another disclosed non-limiting embodiment of the present disclosure includes an outer airfoil wall surface between a leading edge and at least one helical axial swirler within the leading edge.

In a further embodiment of the foregoing embodiment, a multiple of helical axial swirlers within the leading edge.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
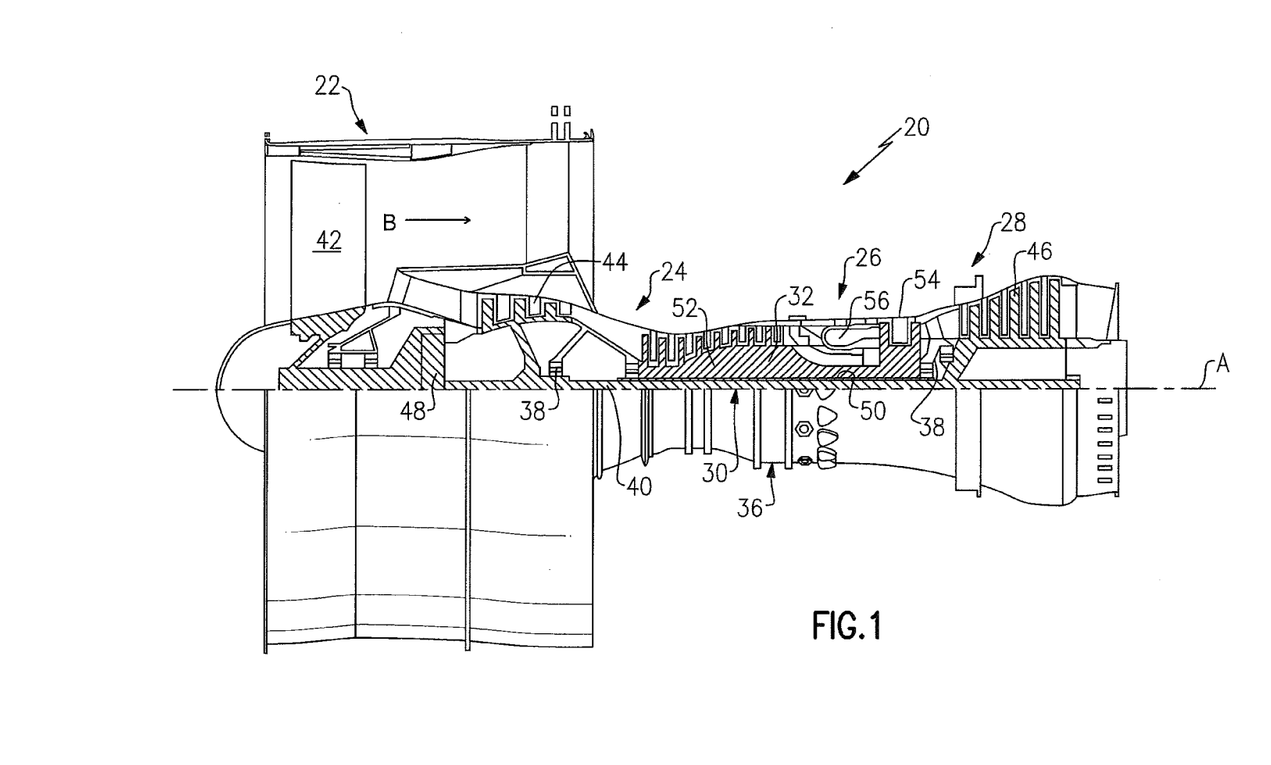
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
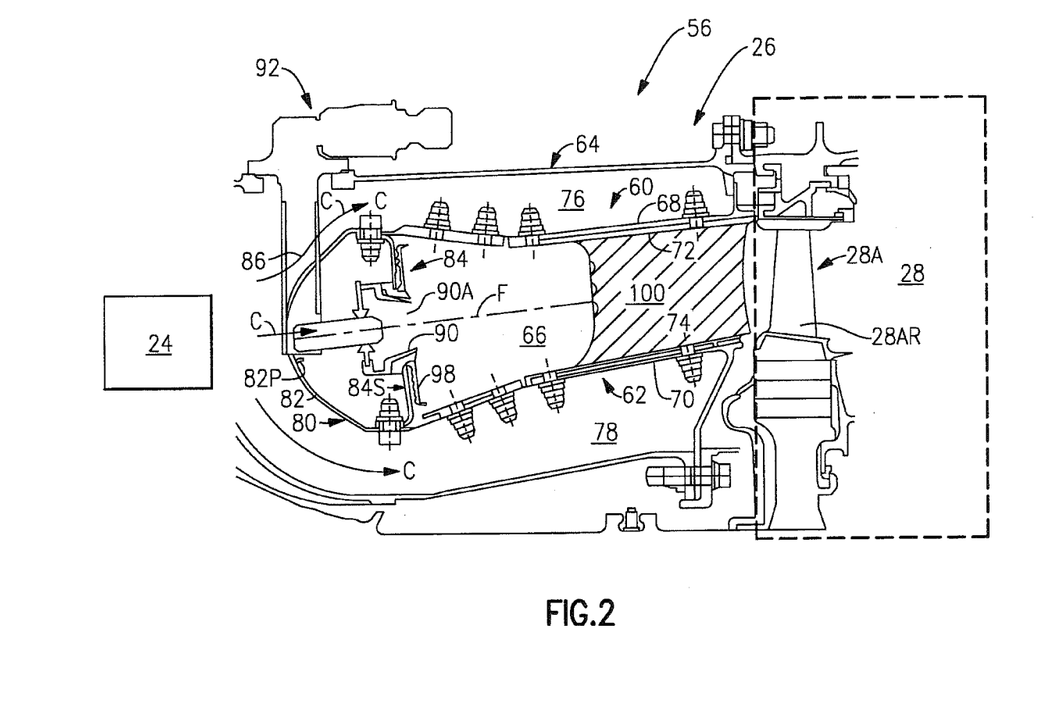
FIG. 2 is a partial longitudinal schematic sectional view of a combustor with integral combustor vanes that may be used with the gas turbine engine shown in FIG. 1.

With reference to FIG. 2, the combustor 56 generally includes a combustor outer liner 60 and a combustor inner liner 62. The outer liner 60 and the inner liner 62 are spaced inward from a diffuser case 64 such that a combustion chamber 66 is defined therebetween. The combustion chamber 66 is generally annular in shape and is defined between combustor liners 60, 62.

The outer liner 60 and the diffuser case 64 define an outer annular plenum 76 and the inner liner 62 and the case 64 define an inner annular plenum 78. It should be understood that although a particular combustor is illustrated, other combustor types with various combustor liner panel arrangements will also benefit herefrom. It should be further understood that the disclosed cooling flow paths are but an illustrated embodiment and should not be limited only thereto.

Figure 3:
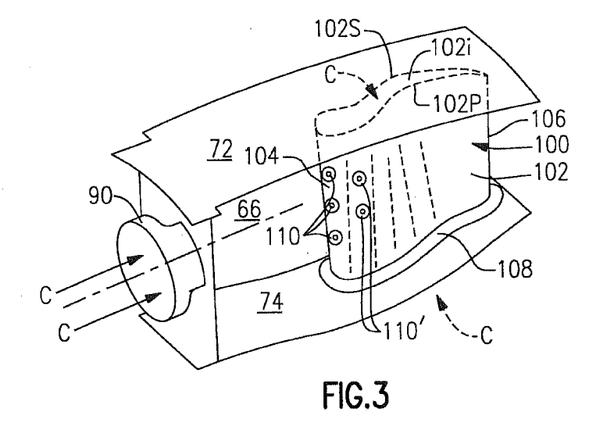
FIG. 3 is a schematic perspective view of the combustor with integral combustor vanes shown in FIG. 2.

Each liner 60, 62 generally includes a respective support shell 68, 70 that supports one or more respective liner panels 72, 74 mounted to a hot side of the respective support shell 68, 70. The liner panels 72, 74 define a liner panel array that may be generally annular in shape. Each of the liner panels 72, 74 may be generally rectilinear and manufactured of, for example, a nickel based super alloy or ceramic material (FIG. 3).

The combustor 56 includes a forward assembly 80 immediately downstream of the compressor section 24 (illustrated schematically) to receive compressed airflow therefrom. The forward assembly 80 generally includes an annular hood 82, a bulkhead assembly 84, a multiple of axial fuel nozzles 86 (one shown) and a multiple of swirler assemblies 90 (one shown) that define a central opening. The annular hood 82 extends radially between, and is secured to, the forwardmost ends of the liners 60, 62 and includes a multiple of circumferentially distributed hood ports 82P that accommodate the respective fuel nozzle 86 and introduces air into the forward end of the combustion chamber 66. The centerline of the fuel nozzle 86 is concurrent with the centerline F of the respective swirler assembly 90. Each swirler assembly 90 is circumferentially aligned with, and/or concentric to, one of the hood ports 82P to project through the bulkhead assembly 84. Each fuel nozzle 86 may be secured to the diffuser case 64 to project through one of the hood ports 82P and through the central opening 90A of the respective swirler assembly 90.

Each bulkhead assembly 84 includes a bulkhead support shell 84S secured to the liners 60, 62, and a multiple of circumferentially distributed bulkhead heatshields segments 98 secured to the bulkhead support shell 84S around the central opening 90A.

The forward assembly 80 directs a portion of the core airflow (illustrated schematically by arrows C) into the forward end of the combustion chamber 66 while the remainder enters the outer annular plenum 76 and the inner annular plenum 78. The multiple of axial fuel nozzles 86, swirler assemblies 90 and associated fuel communication structure defines a fuel injection system 92 (illustrated schematically) that supports combustion in the combustion chamber 66.

The combustor 56 further includes a multiple combustor vanes 100 integrated into the combustor 56 between the liner panels 72, 74 (also illustrated in FIG. 3). The combustor vanes 100 extends at least partially into the combustion chamber 66—shown completely within the combustor 56 in the disclosed non-limited embodiment—the primary zone to perform combustor dilution/mixing requirements such that a turbine rotor assembly 28A is the first stage immediately downstream of the combustor 56. That is, no first stage vane is required immediately downstream of the combustor 56 as the combustor vanes 100 provide the performance characteristics of a turbine first stage vane in terms of turbine flow metering and compressor cycle matching. In one disclosed, non-limiting embodiment the combustor vanes 100 define an axial length between 35%-65% of the combustion chamber 66. Moreover, the combustor vanes 100 may be positioned relative to the axial fuel nozzles 86 to block hot streaks from progressing into the turbine section 28.

The combustor vanes 100 may be arranged downstream and along the axis F of each of the multiple of axial fuel nozzles 86 between two opposed, generally planar liner panels 72, 74 (FIG. 3). The area between the combustor vanes 100 defines the throat area and thereby determines the combustor pressure ratio. It should be appreciated that the number of combustor vanes 100 may be equivalent or different than the number of fuel nozzles 86. The combustor vanes 100 facilitate a decrease in the overall length of the combustor section 26 and thereby the engine 20 as a result of improved mixing in the combustion chamber 66, and by elimination of conventional dilution holes and the elimination of a separate first stage turbine vane (e.g., nozzle guide vane) of the turbine section 28.

With reference to FIG. 3, the combustor vanes 100 are defined by an outer airfoil wall surface 102 between a leading edge 104 and a trailing edge 106. The outer airfoil wall surface defines a generally concave shaped portion to form a pressure side 102P and a generally convex shaped portion forming a suction side 102S. A fillet 108 (only one shown) may be located between the airfoil wall surface 102 and the adjacent generally planar liner panels 72, 74.

Figure 4A:
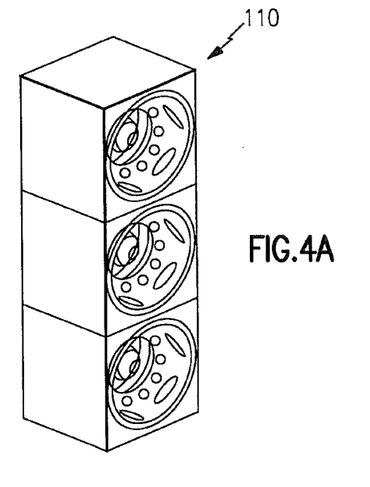
FIG. 4A is a schematic perspective view of an array of helical axial swirlers according to one disclosed non-limiting embodiment.
Figure 4B:
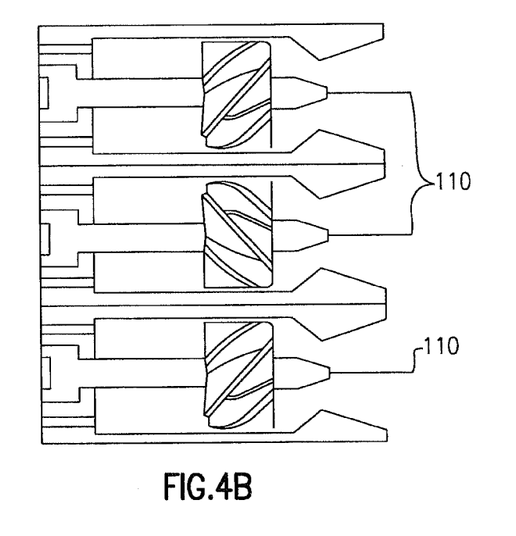
FIG. 4B is a sectional view of the array of helical axial swirlers of FIG. 4A.

The combustor vanes 100 each include a multiple swirlers 110 along the leading edge 104 (also shown in FIGS. 4A and 4B). The swirler 110 may be assembled radially from an inner diameter toward an outer diameter of each combustor vane 100 to complete an integrated combustor vane leading edge assembly. The combustor vanes 100 receive core airflow (illustrated schematically by arrows C) from the outer annular plenum 76 and/or the inner annular plenum 78 for communication to the multiple swirlers 110 through a hollow interior 102i defined by the outer airfoil wall surface 102. Although three (3) swirler 110 are stacked along the leading edge 104 in the disclosed non-limiting embodiment, it should be appreciated that any number may alternatively be provided. The various combustor vane 100 configurations described herein may use refractory metal core (RMC) material and manufacturing processes which are particularly suited for intricate and detailed cooling circuits. It should be understood that other materials and manufacturing processes may alternatively or additionally utilized.

It should be appreciated that one or more of the multiple of swirlers 110 may alternatively or additionally be located along the outer airfoil wall surface 102 between the leading edge 104 and the trailing edge 106 (see FIG. 3; e.g., 110').

Figure 5:
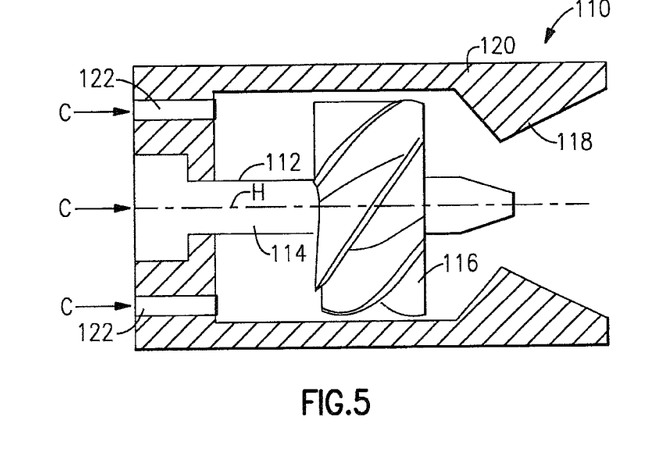
FIG. 5 is a schematic sectional view of one helical axial swirler.
Figure 6:
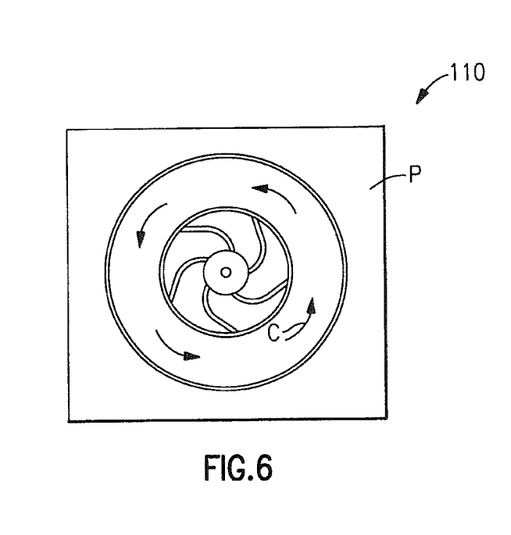
FIG. 6 is a front view of the helical axial swirler of FIG. 5.

With reference to FIG. 5, each of the swirler 110 generally includes a support 112 with a central passage 114 along an axis H, a helical axial swirler 116 and a convergent-divergent section 118 which is defined by a housing 120. The support 112 locates the helical axial swirler 116 upstream of the convergent-divergent section 118. The multiple swirlers 110 define a mixing plane P (FIG. 6) which may be positioned to, for example, maintain sufficient temperatures at low power.

Airflow is communicated from the hollow interior 102i through a multiple of passages 122 in the housing 120 for communication through the helical axial swirler 116 in a generally annular manner then the convergent-divergent section 118 to provide a non-reacting flow for mixture with a reacting flow into the combustion chamber 66. As utilized herein, the non-reacting flow is the airflow from the combustor vanes 100 while the reacting flow is the oncoming hot combustion gases from the upstream multiple of axial fuel nozzles 86 and swirler assemblies 90 (FIG. 3).

The combustor vanes 100 first comes into contact with the oncoming hot combustion gases reacting flow at the leading edge 104. The swirler 110 are located in the leading edge 104 of the combustor vanes 100 where the non-reacting swirling flow passes through the convergent-divergent section 118 before discharge into the combustion chamber 66 to quench the oncoming hot combustion gases to form a quench or dilution zone axially aft of the rich burn zone. The helical axial swirler 116 directs the non-reacting flow tangentially (FIG. 6) from the swirler 110 to modulate the mixing of the non-reacting flow with the oncoming hot combustion gases. The effective mixing provided by the swirler 110 further minimizes NO$_X$ emissions.

The swirler 110 (three shown) may be arranged to modulate the mixing with the oncoming hot combustion gases. For example, three swirler 110 are stacked along the leading edge 104 in the disclosed non-limiting embodiment. It should be appreciated that various numbers and various combinations of tailored swirler 110 may be utilized to provide the desired dilution and mixing effects. The swirler 110 characteristics such as size, angle, pitch and/or other characteristics may be tailored to provide a desired effect. For example only, the characteristics of the individual swirler 110 and the array thereof may be tailored to generate a flat combustor exit profile, control combustion gas temperature, minimize residence time and/or minimize the local fuel rich zone to control smoke generation.

Figure 7A:
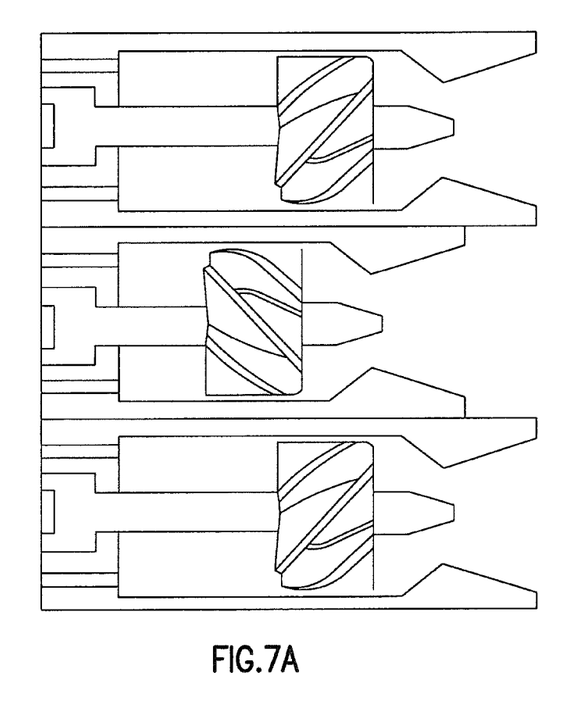
FIG. 7A is a schematic sectional view of an array of helical axial swirlers according to another disclosed non-limiting embodiment.
Figure 7B:
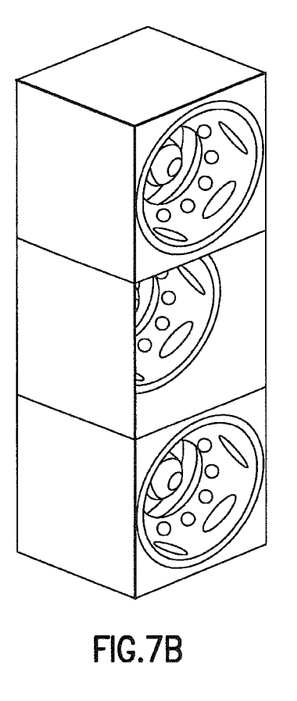
FIG. 7B is a perspective view of the array of helical axial swirlers of FIG. 7A.

Furthermore, the characteristics of the individual swirler 110 may be controlled relative to the other swirler 110. For example, one of the multiple swirlers 110 may be axially displaced relative to the radially inner and radially outer swirler 110 (FIGS. 7A and 7B).

Figure 8:
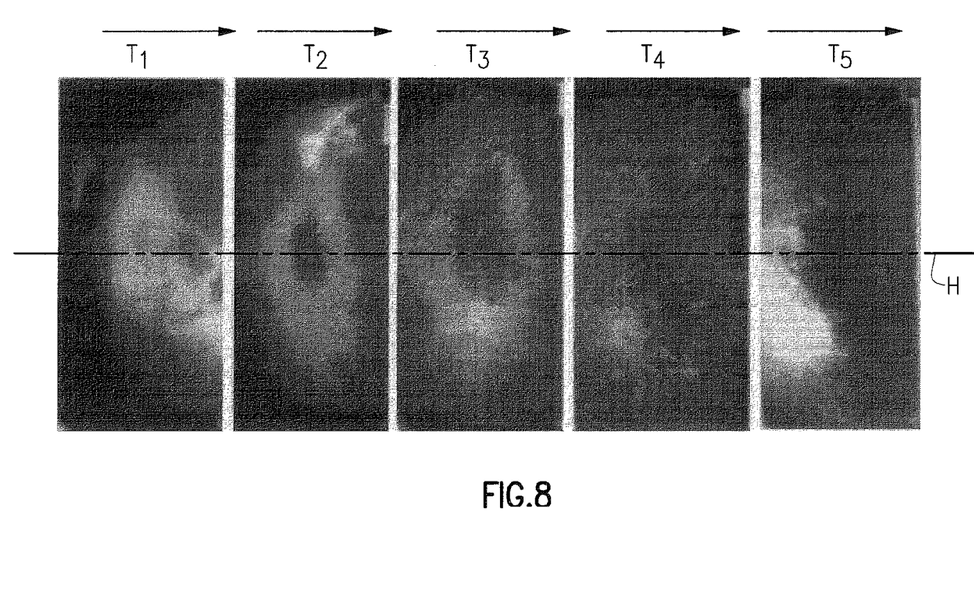
FIG. 8 is time lapsed view of a jet from one helical axial swirler.

The swirler 110 replace the function of conventional dilution holes to modulate the mixing of the hot combustion gas reacting flow. The jet characteristics emerging from the leading edge 104 starts with a large concentration of flux at the inner radius, disperses, diffuses, and dilutes as required with increasing distance from the leading edge 104 (FIG. 8). This process occurs at every radially displaced swirler 110 location to provide effective dilution characteristics with high swirl and corresponding three-dimensional mixing to control the dilution process in the combustion chamber 66. The degree of the swirl of the non-reacting flow in comparison to the degree of the swirl of the reacting flow is thereby balanced to create the desired dilution and mixing effects.

Figures 9A, 9B:
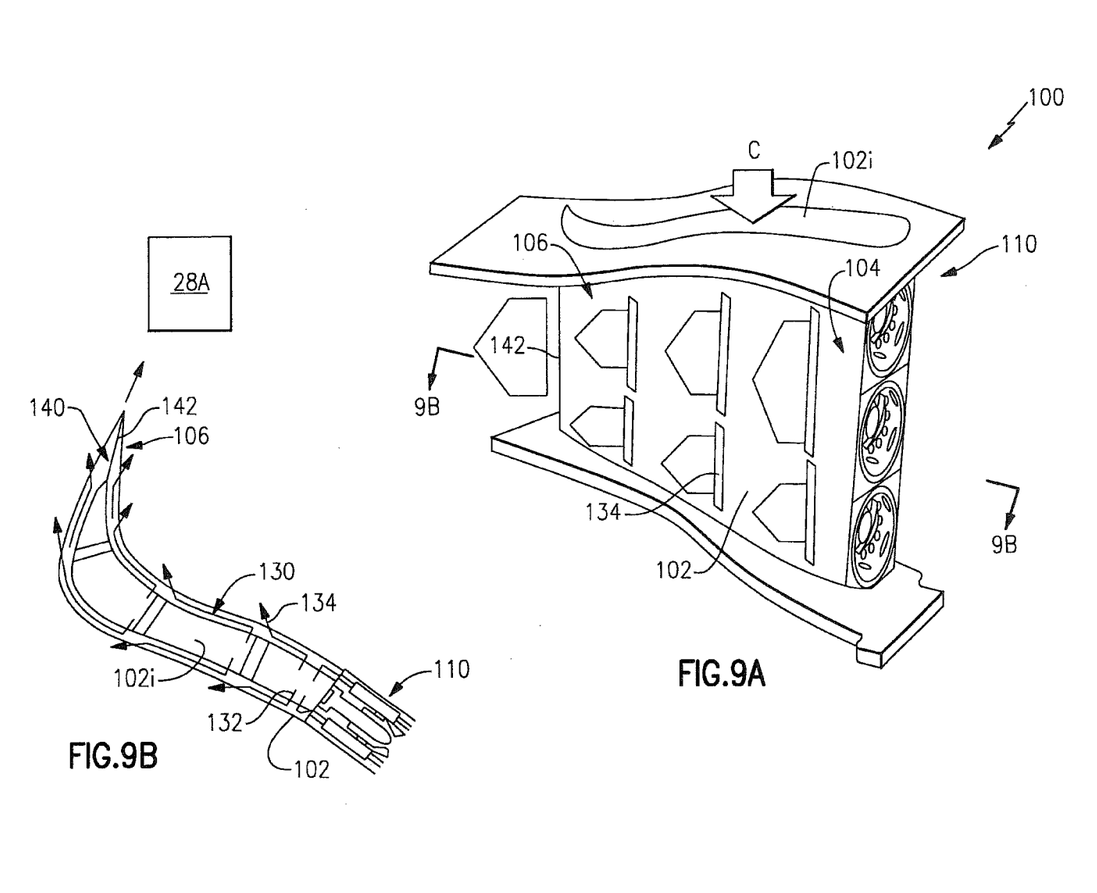
FIG. 9A is a perspective view of a combustor vane with a multiple of slot cooling RMC microcircuits along a main body thereof.
FIG. 9B is a sectional view of the combustor vane taken along line 9B-9B in FIG. 9A.
Figure 10A:
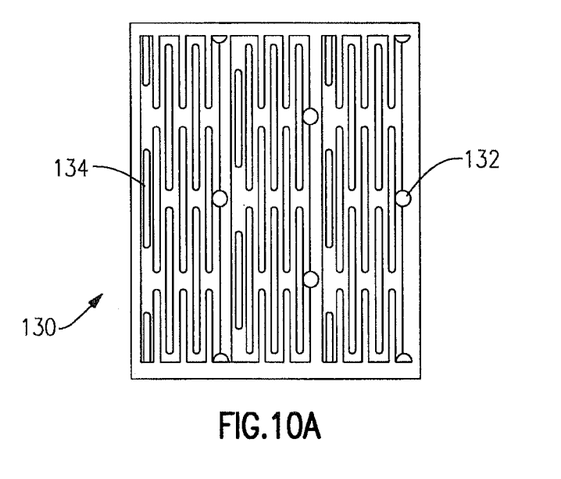
FIG. 10A is a schematic face view of the multiple of slot cooling RMC microcircuits.
Figure 10B:
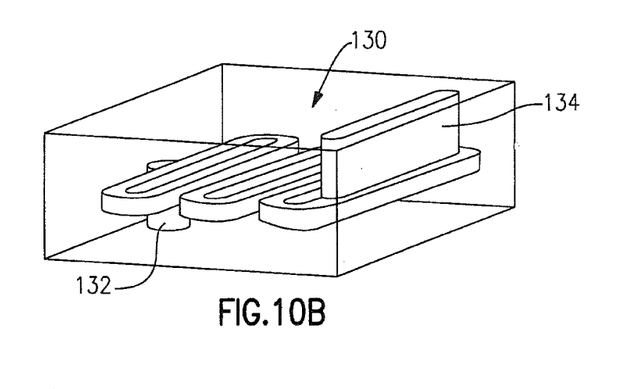
FIG. 10B is a perspective partial phantom view of one slot cooling RMC microcircuit from a first direction.
Figure 10C:
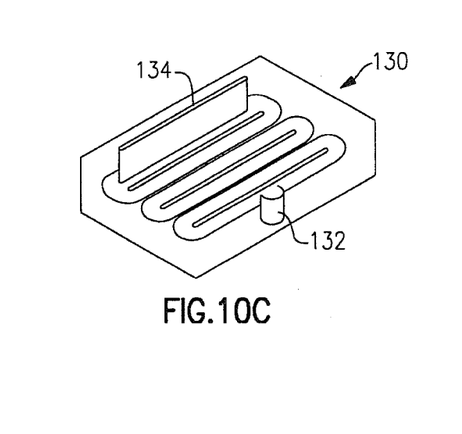
FIG. 10C is a perspective partial phantom view of one slot cooling RMC microcircuit from a second direction.
Figure 10D:
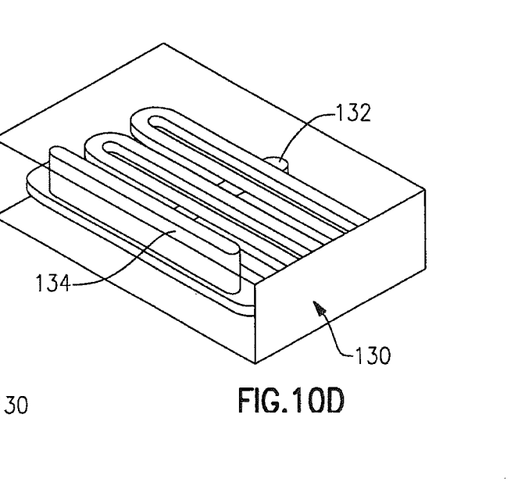
FIG. 10D is a perspective partial phantom view of one slot cooling RMC microcircuit from a third direction.

With reference to FIGS. 9A and 9B, the outer airfoil wall surface 102 of the combustor vanes 100 aft of the leading edge 104 may be cooled by a multiple of RMC wall microcircuits 130 (also shown in FIGS. 10A-10C). Airflow is communicated from the hollow interior 102i through an inlet supply 132 to feed the RMC wall microcircuit 130. The RMC wall microcircuit 130 communicates with one or more slot film exits 134 which may be tailored to minimize film blow-off. It should be appreciated that any number of RMC wall microcircuits 130 may be utilized and the dimensions thereof tailored to the particular combustor vanes 100. Both cooling efficiency and slot film cooling are parameters that result in high cooling effectiveness for RMC microcircuit applications in the combustor vanes 100.

Figure 11:
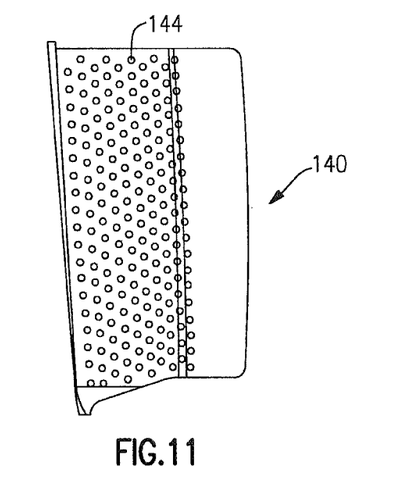
FIG. 11 is a schematic face view of a trailing edge cooling RMC microcircuits.

The trailing edge 106 of the combustor vanes 100 may be cooled with a centerline RMC microcircuit 140. The centerline RMC microcircuit 140 includes a passage 142 which are supported by an array of pedestals 144 (FIG. 11). The array of pedestals 144 may be arranged to increase the durability of the first stage turbine blade 28A (illustrated schematically and in FIG. 2) through direction of the concentrated cooling efflux towards a root section 28AR to attenuate potential reactive hot spots (FIG. 2).

The predominant cooling mechanisms inherent to RMC microcircuit cooling are the slot film cooling to attain maximum film coverage, and localized heat pick-up, usually denoted as a cooling efficiency. Both cooling efficiency and slot film cooling are parameters that result in high cooling effectiveness for a RMC microcircuit application in the combustor vanes 100.

Figure 12:
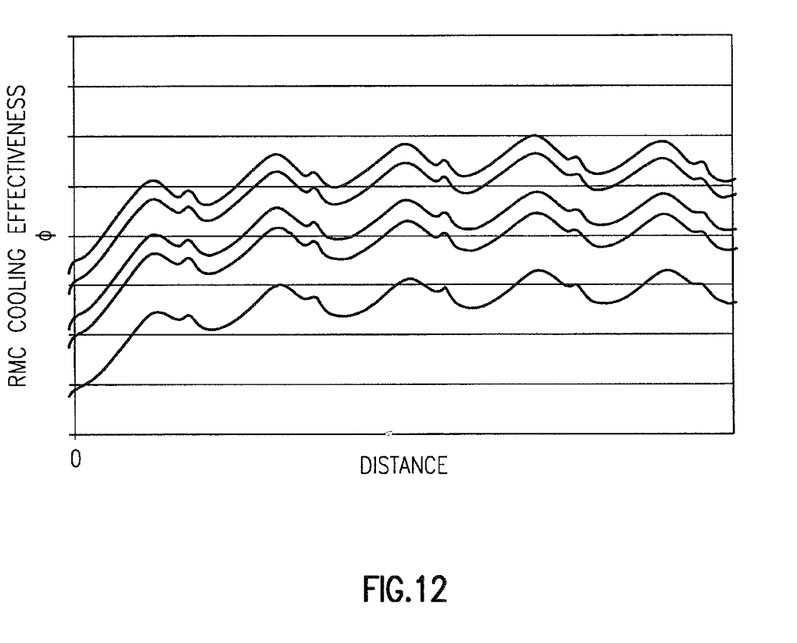
FIG. 12 is a graphical representation of cooling RMC microcircuit effectiveness.

With reference to FIG. 12, cooling effectiveness versus distance for a typical RMC microcircuit is disclosed as a function of coolant flux through the RMC microcircuit. Cooling effectiveness is defined as a dimensionless temperature ratio; wherein a cooling effectiveness of one (1) implies that the metal temperature is the same as the coolant temperature; and a cooling effectiveness of zero (0) implies that the metal temperature is the same as the gas temperature. It can be seen from this Figure that a relatively high cooling effectiveness of approximately 0.6-0.7 is readily achieved. This level of effectiveness competes well with other cooling arrangements, such as impingement cooling, with the further benefit that less airflow is consumed and the airflow may be tailored and controlled to address local hot spot regions. Reduced airflow usage for cooling increases overall engine efficiency. Reduce Turbine Cooling Air (TCA) requirements by 10-12% engine core flow, WAE (from 25-30% to 15-18% WAE) due to the elimination of first high pressure vane cooling.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor section for a gas turbine engine comprising:
   a combustion chamber; and
   a combustor vane that extends at least partially into said combustion chamber;
   wherein said combustor vane includes an internal helical axial swirler configured with a passage that extends helically through said helical axial swirler and about and along an axis.

2. The combustor section as recited in claim 1 further comprising:
   an outer liner; and
   an inner liner disposed radially inward of the outer liner and the combustion chamber being defined between said outer and inner liners, said combustor vane located between said outer liner and said inner liner.

3. The combustor section as recited in claim 1, wherein said combustor vane defines an axial length between 35%-65% of said combustion chamber, said axial length defined along an axis which extends from a fuel injector through said combustion chamber.

4. The combustor section as recited in claim 1, wherein said combustor vane includes film cooling along a leading edge thereof.

5. The combustor section as recited in claim 1, wherein said helical axial swirler is along a leading edge thereof.

6. The combustor section as recited in claim 1, wherein said combustor vane is manufactured of a refractory metal core (RMC) material.

7. The combustor section as recited in claim 6, wherein said combustor vane includes an RMC circuit along a main body thereof.

8. The combustor section as recited in claim 6, wherein said combustor vane includes a centerline RMC microcircuit with pedestals along a trailing edge thereof.

9. The combustor section as recited in claim 1, wherein said helical axial swirler is one of a multiple of helical axial swirlers along a leading edge of said combustor vane.

10. The combustor section as recited in claim 9, wherein a first of said multiple of helical axial swirlers is axially offset with respect to a second of said multiple of helical axial swirlers.

11. The combustor section as recited in claim 9, wherein said multiple of helical axial swirlers are stacked along said leading edge.

12. The combustor section as recited in claim 1, wherein the combustor vane is configured with an axially extending passage operable to direct fluid axially into said helical axial swirler.

13. The combustor section as recited in claim 12, wherein said helical axial swirler is disposed within said axially extending passage.

14. The combustor section as recited in claim 12, wherein said helical axial swirler is disposed inline with said axially extending passage.

15. A combustor section vane for a combustor for a gas turbine engine comprising:
    an outer airfoil wall surface between a leading edge and a trailing edge; and
    at least one helical axial swirler within said leading edge;
    wherein said helical axial swirler is configured with a passage that extends helically through said helical axial swirler and about and along an axis.

16. The combustor section vane as recited in claim 15, further comprising a multiple of helical axial swirlers within said leading edge.

17. The combustor section vane as recited in claim 15, wherein said helical axial swirler is configured within an axially extending passage in a wall of the combustor section vane.

18. The combustor section vane as recited in claim 17, wherein said axially extending passage includes a convergent-divergent section downstream of said helical axial swirler.

19. A combustor section for a gas turbine engine comprising:
    a combustion chamber; and
    a combustor vane that extends at least partially into said combustion chamber;
    wherein said combustor vane includes a dilution jet on a leading edge thereof, and said dilution jet includes an axially extending helical passage with a convergent-divergent section.

* * * * *